(12) United States Patent
Kudo

(10) Patent No.: US 9,754,019 B2
(45) Date of Patent: *Sep. 5, 2017

(54) INFORMATION PROCESSING DEVICE, INFORMATION PROCESSING METHOD AND COMPUTER PROGRAM FOR HIGHLIGHTING CONTENT IN AN ELECTRONIC DOCUMENT

(71) Applicant: Sony Corporation, Tokyo (JP)

(72) Inventor: Shunsuke Kudo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,970

(22) Filed: Mar. 9, 2016

(65) Prior Publication Data

US 2016/0188636 A1 Jun. 30, 2016

Related U.S. Application Data

(63) Continuation of application No. 13/176,271, filed on Jul. 5, 2011, now Pat. No. 9,384,268.

(30) Foreign Application Priority Data

Jul. 13, 2010 (JP) ................................ 2010-158775

(51) Int. Cl.
G06F 17/30 (2006.01)
G06T 11/60 (2006.01)

(52) U.S. Cl.
CPC .. *G06F 17/30657* (2013.01); *G06F 17/30268* (2013.01); *G06F 17/30554* (2013.01); *G06F 17/30572* (2013.01); *G06T 11/60* (2013.01)

(58) Field of Classification Search
None
See application file for complete search history.

(56) References Cited

U.S. PATENT DOCUMENTS

| 4,456,973 | A | 6/1984 | Carlgren et al. |
| 5,119,353 | A | 6/1992 | Asakura |
| 7,305,381 | B1 | 12/2007 | Poppink et al. |
| 2003/0130836 | A1 | 7/2003 | Chang et al. |
| 2007/0061717 | A1 | 3/2007 | Cragun et al. |
| 2009/0031311 | A1 | 1/2009 | Chang et al. |
| 2009/0106206 | A1 | 4/2009 | Sherman |
| 2010/0023493 | A1 | 1/2010 | Douglis et al. |
| 2010/0145939 | A1 | 6/2010 | Kumar et al. |
| 2011/0191369 | A1 | 8/2011 | Mehra et al. |

FOREIGN PATENT DOCUMENTS

WO 2007/000679 A2 1/2007

*Primary Examiner* — Ryan D McCulley
(74) *Attorney, Agent, or Firm* — Chip Law Group

(57) ABSTRACT

An information processing apparatus that compares content to stored information identifying a plurality of words, identifies words from the content that match words included in the stored information, retrieves information based on the identifying, and generates an image to be displayed based on the retrieved information.

19 Claims, 13 Drawing Sheets

FIG.2

| WORD | SEARCH TIME NUMBER | CHECKED INFORMATION |
|---|---|---|
| brown | 1 | 1 |
| lazy | 5 | — |
| ⋮ | ⋮ | ⋮ |

| WORD | MEANING | LEVEL | GENRE |
|---|---|---|---|
| authentic | AUTHENTIC | 5 | LAW/MUSIC |
| author | AUTHOR | 2 | OCCUPATION |
| ⋮ | ⋮ | ⋮ | ⋮ |

161, 162, 163, 164

FIG.10
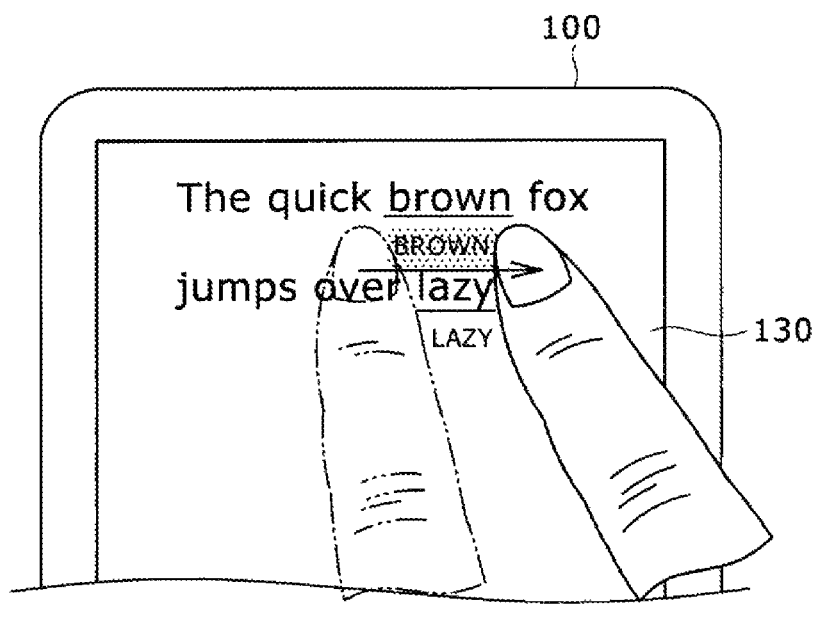
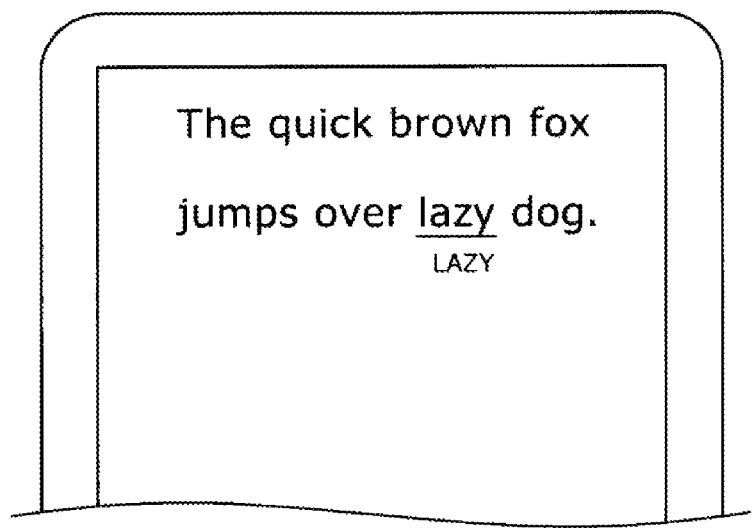

FIG. 12

| | NOTICED WORD | RELATED INFORMATION/REPRESENTATION |
|---|---|---|
| DICTIONARY FUNCTION | WORD LOOKED UP IN DICTIONARY | MEANING OF WORD |
| ADDRESS BOOK | PLACE NAME OF ADDRESS OF FRIEND | NAME OF FRIEND |
| WRITING INTO BLOG | ANALYZE WRITE SENTENCE TO EXTRACT SIGNIFICANT WORD | DISPOSE BUTTON FOR JUMPING TO URL OF WRITTEN BLOG |
| BOOK STORED IN DEVICE | AUTHOR NAME | BOOK NAME OF AUTHOR STORED IN DEVICE |
| PHOTOGRAPH STORED IN DEVICE | NAME OF PLACE OF PHOTOGRAPHING | PHOTOGRAPH STORED IN DEVICE |
| MUSIC STORED IN DEVICE | TITLE OF PIECE OF MUSIC, NAME OF COMPOSER | DISPOSE BUTTON FOR REPRODUCING MUSIC STORED IN DEVICE |
| WORD TO WHICH MARKER WAS APPLIED IN BOOK BY USER ITSELF | WORD TO WHICH MARKER IS APPLIED | DISPOSE BUTTON FOR JUMPING TO PLACE TO WHICH MARKER IS APPLIED AT DIFFERENT PLACE BY USER ITSELF |

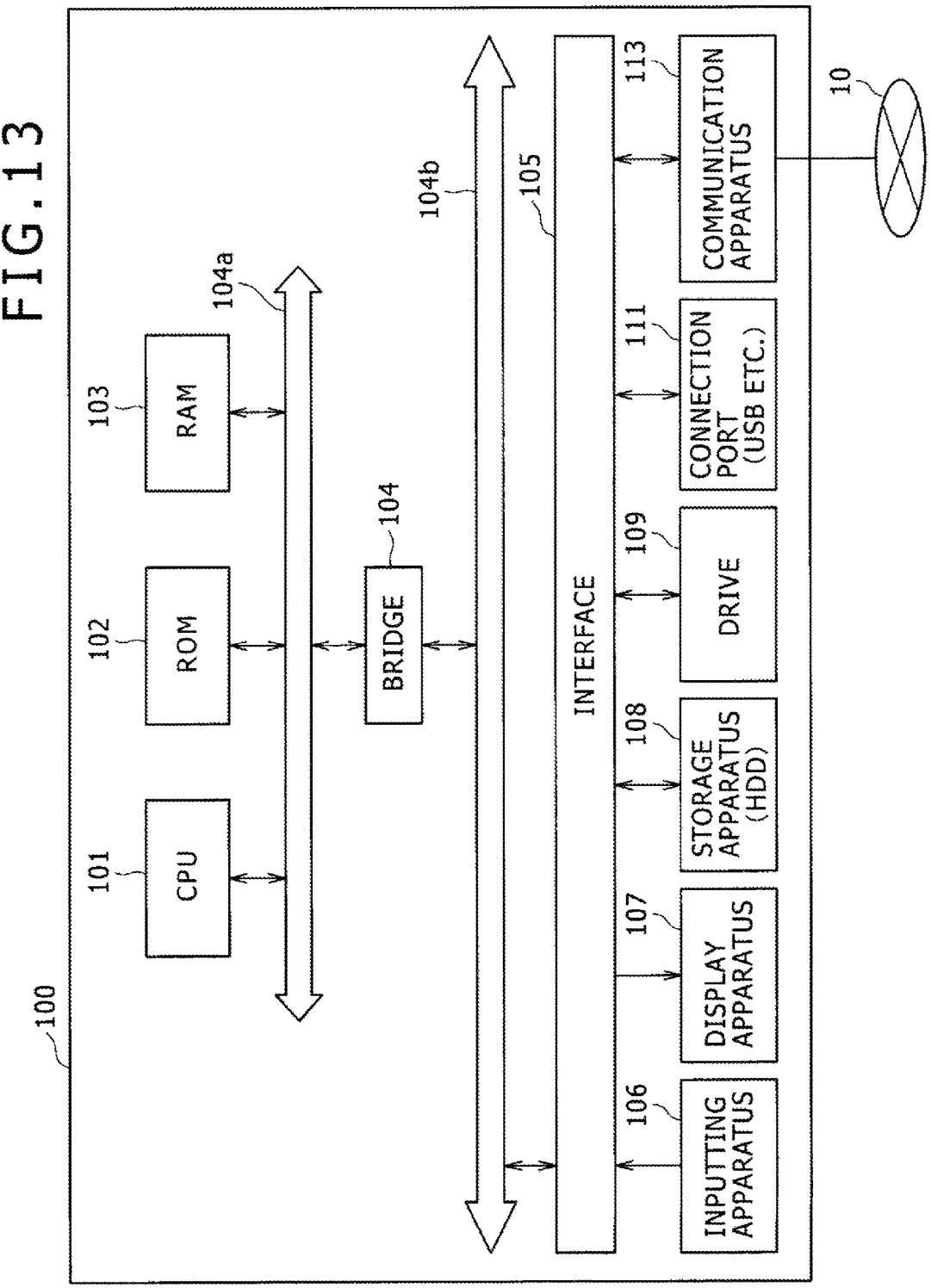

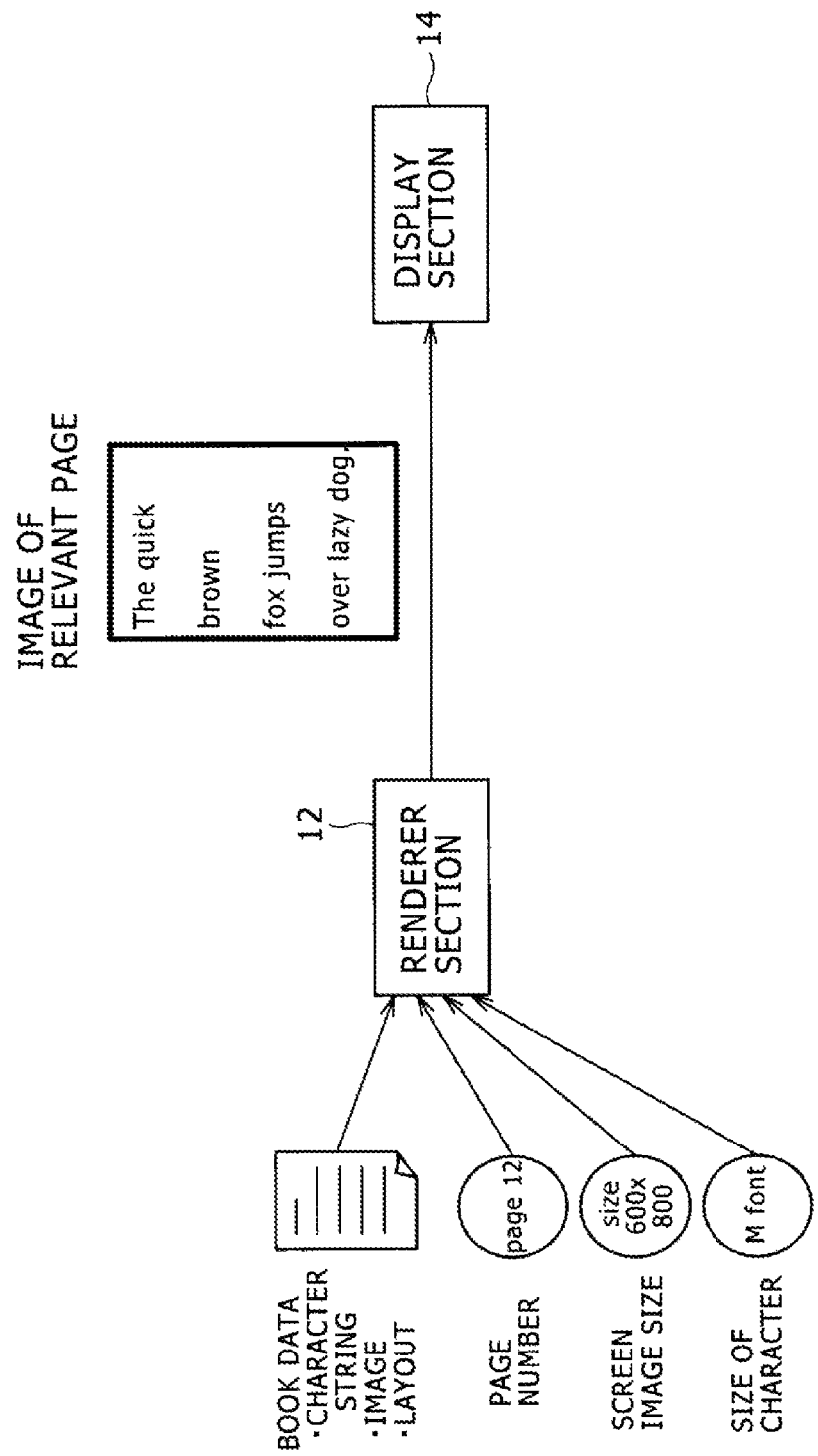

INFORMATION PROCESSING DEVICE, INFORMATION PROCESSING METHOD AND COMPUTER PROGRAM FOR HIGHLIGHTING CONTENT IN AN ELECTRONIC DOCUMENT

CROSS REFERENCE TO RELATED APPLICATION

This application claims the benefit of priority under 35 U.S.C. §119 from Japanese Patent Application JP 2010-158775 filed in the Japanese Patent Office on Jul. 13, 2010, the entire content of which is hereby incorporated by reference.

BACKGROUND

The present disclosure relates to an information processing device, an information processing method and a computer program.

It has become possible to browse, in place of a book which is a conventional printed matter, an electronic book provided as a content using an electronic book browsing device (refer, for example, to Japanese Patent Laid-Open No. 2003-150618). Reduction of the cost and reduction of the space required for printing, binding and distribution of a book can be implemented by utilization of the electronic book.

An electronic book browsing device is a device for browsing the substance of a book. In an electronic book browsing device in related art, book data including character strings, images, information of a layout and so forth and setting information of page numbers, sizes of screen images, sizes of characters and so forth for example, as illustrated in FIG. 14 are stored. A renderer section 12 of the electronic book browsing device produces an image for displaying the substance of the book data on a display section 14 based on the setting information. By displaying the produced image on the display section 14, the user can browse the electronic book.

SUMMARY

However, the electronic book browsing device in related art can allow only browsing of the substance of an electronic book. By operating the electronic book browsing device, the user not only can browse a book but also can add an additional element such as addition of a tag such as a bookmark, drawing of a picture or the like to the substance of the electronic book. However, such addition as just described is carried out by an active operation of the user, but the electronic book browsing device cannot automatically change the display substance of an electronic book or the like.

Therefore, it is desirable to provide a new and improved information processing device, information processing method and computer program which can automatically implement user experience specialized for a user who owns the device.

According to one exemplary embodiment, the disclosure is directed to an information processing apparatus, method and computer-readable medium that compares content to stored information identifying a plurality of words, identifies words from the content that match words included in the stored information, retrieves information based on the identifying, and generates an image to be displayed based on the retrieved information.

With the disclosed information processing device, information processing method and computer program, user experience specified for a user who owns the information processing device can be implemented automatically.

The above and other features and advantages of the present disclosure will become apparent from the following description and the appended claims, taken in conjunction with the accompanying drawings.

BRIEF DESCRIPTION OF THE DRAWINGS

FIG. 2 is a view illustrating an example of a configuration of a history information database;

FIG. 3 is a view illustrating an example of a configuration of a dictionary database;

FIG. 10 is a schematic view showing a display changing state when an operation for deleting related information of some words from an overlay image is carried out;

FIG. 12 is a table illustrating an example of noticed words and related information associated with the noticed words;

FIG. 13 is a block diagram showing an example of a hardware configuration of the electronic book browsing device according to the embodiment; and FIG. 14 is a diagrammatic view illustrating an image production process by an electronic book browsing device in related art.

DETAILED DESCRIPTION OF THE PREFERRED EMBODIMENT

Figure 1:
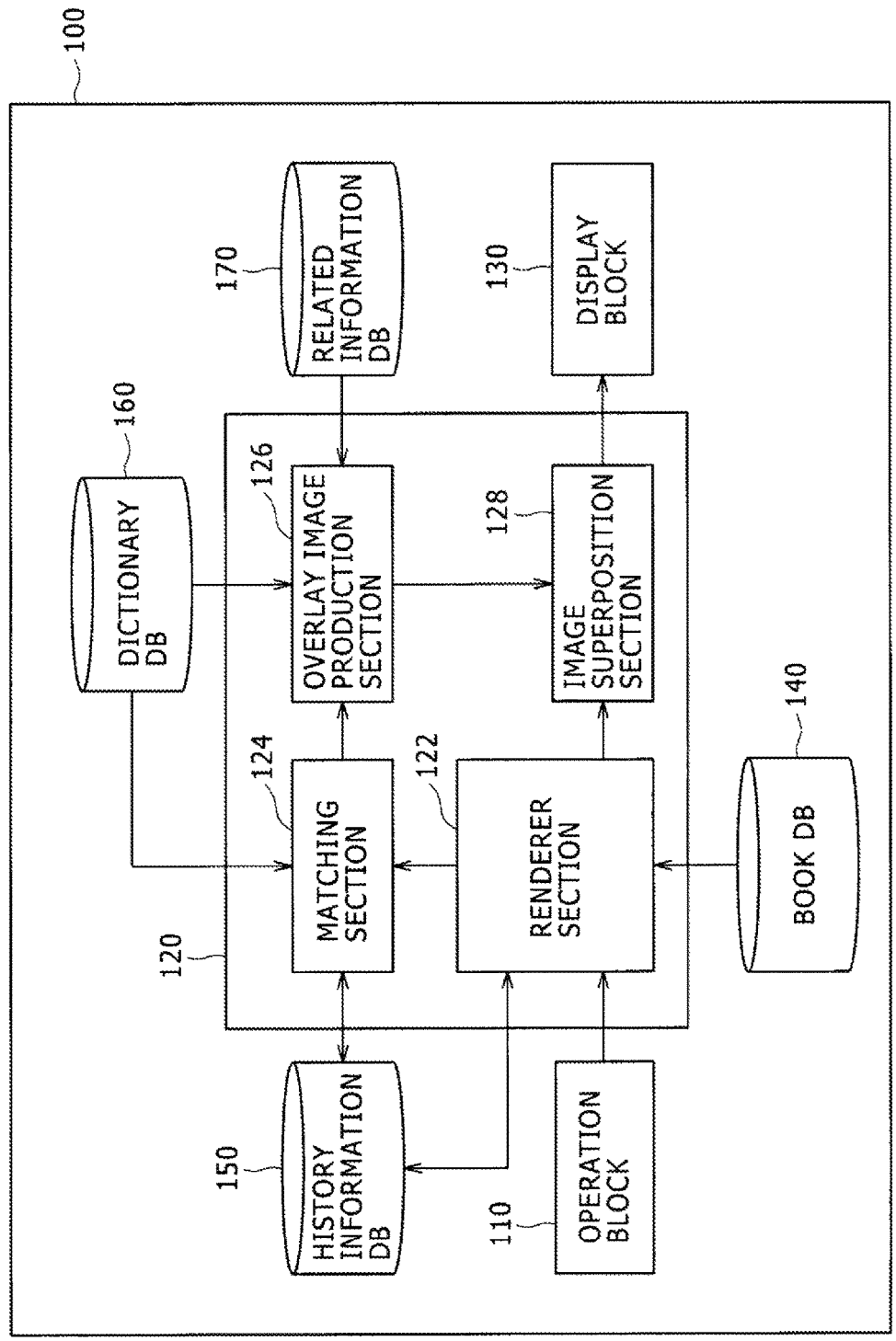
FIG. 1 is a block diagram showing a functional configuration of an electronic book browsing device according to an embodiment of the present disclosure.

In the following, a preferred embodiment of the present disclosure is described in detail with reference to the accompanying drawings. It is to be noted that, in the present specification and drawings, like elements having the substantially same functional configuration are denoted by like reference characters and overlapping description is omitted to avoid redundancy.

It is to be noted that description is given in the following order:

1. Outline of the Electronic Book Browsing Device
2. Configuration of the Electronic Book Browsing Device
3. Displaying Process by the Electronic Book Browsing Device
4. Example of the Hardware Configuration

<1. Outline of the Electronic Book Browsing Device>

First, an outline of an electronic book browsing device according to an embodiment is described. The electronic book browsing device is a device for automatically implementing user experience specialized for a user who owns the device using information unique to the user which exists in the device and can be acquired by a function other than an electronic book browsing function. As the information unique to the user, a search result of a dictionary function or a web browser function, the substance of registrations of an address book function, a genre of book data stored in the device and so forth are available.

The electronic book browsing device according to the present embodiment produces, when the substance of an electronic book which is one of contents is displayed on a display block, an image to which information beneficial to a user who browses the electronic book or information relating to the user is added using the user-unique information. Consequently, the electronic book can be provided in a state in which it is easy to read by the user and also an image, music or the like relating to the substance of the electronic book can be displayed. In the following, a process for adding additional information suitable for the user when the substance of the electronic book is displayed using a search history of the dictionary function as the user-unique information is taken as an example, and the configuration of the electronic book browsing device of the present embodiment and processing by the device are described in detail.

<2. Configuration of the Electronic Book Browsing Device>

Now, a functional configuration of the electronic book browsing device 100 according to the present embodiment is described with reference to FIGS. 1 to 3. It is to be noted that FIG. 1 is a block diagram showing a functional configuration of the electronic book browsing device 100 according to the present embodiment. FIG. 2 is a view illustrating an example of a configuration of a history information database 150. FIG. 3 is a view illustrating an example of a configuration of a dictionary database 160.

Referring first to FIG. 1, the electronic book browsing device 100 according to the present embodiment includes an operation block 110, a displaying processing block 120, a display block 130, a book database (DB) 140, a history information database (DB) 150, a dictionary database (DB) 160 and a related information database (DB) 170.

The operation block 110 is an inputting section for inputting operation information for operating the electronic book browsing device 100 by the user. As the operation block 110, for example, buttons, levers, touch sensors provided in lamination on or under the display block 130 and so forth can be used. The user can carry out selection of an electronic book to be browsed or a function to be executed, turning of a page of a book, inputting of characters or the like and so forth using the operation block 110. The information relating to display of an electronic book, for example, selection information of an electronic book to be displayed on the display block 130, from within operation information inputted from the operation block 110 or the like is outputted to the displaying processing block 120.

The displaying processing block 120 produces an image representative of the substance of an electronic book. The displaying processing block 120 is configured from a renderer section 122, a matching section 124, an overlay image production section 126 and an image superposition section 128.

The renderer section 122 produces a basic image to be displayed on the display block 130 based on book data representative of the substance of an electronic book and setting information such as a page number, a screen size, a size of characters and so forth when the book data is to be displayed. The book data is information including, for example, the substance corresponding to one electronic book. The page number signifies a number of a page to be actually browsed by the user during browsing of an electronic book. Further, the screen size signifies the size of a screen to which the substance of an electronic book to be browsed by the user is outputted as a video, and the size of characters signifies the size of characters when a character string of the electronic book is to be displayed. The setting information may be set in advance or can be set arbitrarily by the user. It is to be noted that the data format of the book data and the setting information is not limited specifically. The renderer section 122 outputs the basic image produced based on the book data and the setting information to the matching section 124 and the image superposition section 128.

The matching section 124 carries out a matching process between a character string included in a page of the electronic book displayed on the display block 130 and history information of the dictionary function. The matching section 124 refers to the history information database 150 to check whether or not a word searched by the user using the dictionary function is included in the displayed page of the electronic book through the matching process and extracts matching words. A word searched by the dictionary function is a noticed word noticed by the user and is information unique to the user. After a word noticed by the user is extracted, the matching section 124 outputs information of the word and a basic image to the overlay image production section 126.

The overlay image production section 126 produces an overly image for displaying information to be presented to the user together with the substance of the electronic book on the display block 130. The overlay image production section 126 acquires related information associated with the word extracted by the matching section 124 and produces an overlay image to be displayed in an overlapping relationship with the basic image. The produced overlay image is outputted to the image superposition section 128.

The image superposition section 128 superposes the basic image produced by the renderer section 122 and the overlay image produced by the overlay image production section 126 with each other to produce an overlap image to be displayed on the display block 130. The overlap image produced by the image superposition section 128 is outputted to the display block 130 and to the user.

The display block 130 is an outputting section for displaying an image. The display block 130 can be configured, for example, using a liquid crystal display unit or an organic EL (electroluminescence) display unit. It is to be noted that the electronic book browsing device 100 according to the present embodiment may include a sound outputting section such as a speaker or the like as one of outputting sections.

The book database 140 stores book data representative of the substance of an electronic book. In the book database 140, data of one or a plurality of books acquired through a medium or a network are accumulated. The book data stored in the book database 140 are converted into data of a format which can be displayed on the display block 130 by the renderer section 122.

The history information database 150 is a storage block for storing a word searched by the user using the dictionary function as history information. The history information database 150 stores, for example, as illustrated in FIG. 2, a word 151 searched using the dictionary function, a search time number 152 representative of a number of times by which the word has been searched by the user, that is, a number of times by which the dictionary database 160 has been referred to with regard to the word, and so forth. Also it is possible for the history information database 150 to store checked information 153 representing that the user stops noticing the word and so forth. A displaying process in which the checked information 153 is used is hereinafter described. The history information database 150 is an example of a storage block for storing information noticed by the user.

The dictionary database 160 is a storage block for storing dictionary information to be used for execution of the dictionary function. The dictionary database 160 stores, for example, as seen in FIG. 3, a word 161, meaning 162 of the word, a level 163 of the word, a genre 164 of the word and so forth. In the present embodiment, the dictionary database 160 is an example of a storage block for storing related information associated with the noticed information.

The related information database 170 is a storage block for storing related information associated with a word. While the electronic book browsing device 100 of the present embodiment includes the dictionary database 160 described above as a storage block for storing related information, it may store a plurality of kinds of related information. For example, a color, an image, music and so forth associated with the word can be stored in the related information database 170. The related information stored in the dictionary database 160 and the related information database 170 is included as additional information in an overlay image.

In the following, a functional configuration of the electronic book browsing device 100 according to the present embodiment is described.

<3. Displaying Process by the Electronic Book Browsing Device>

Figure 4:
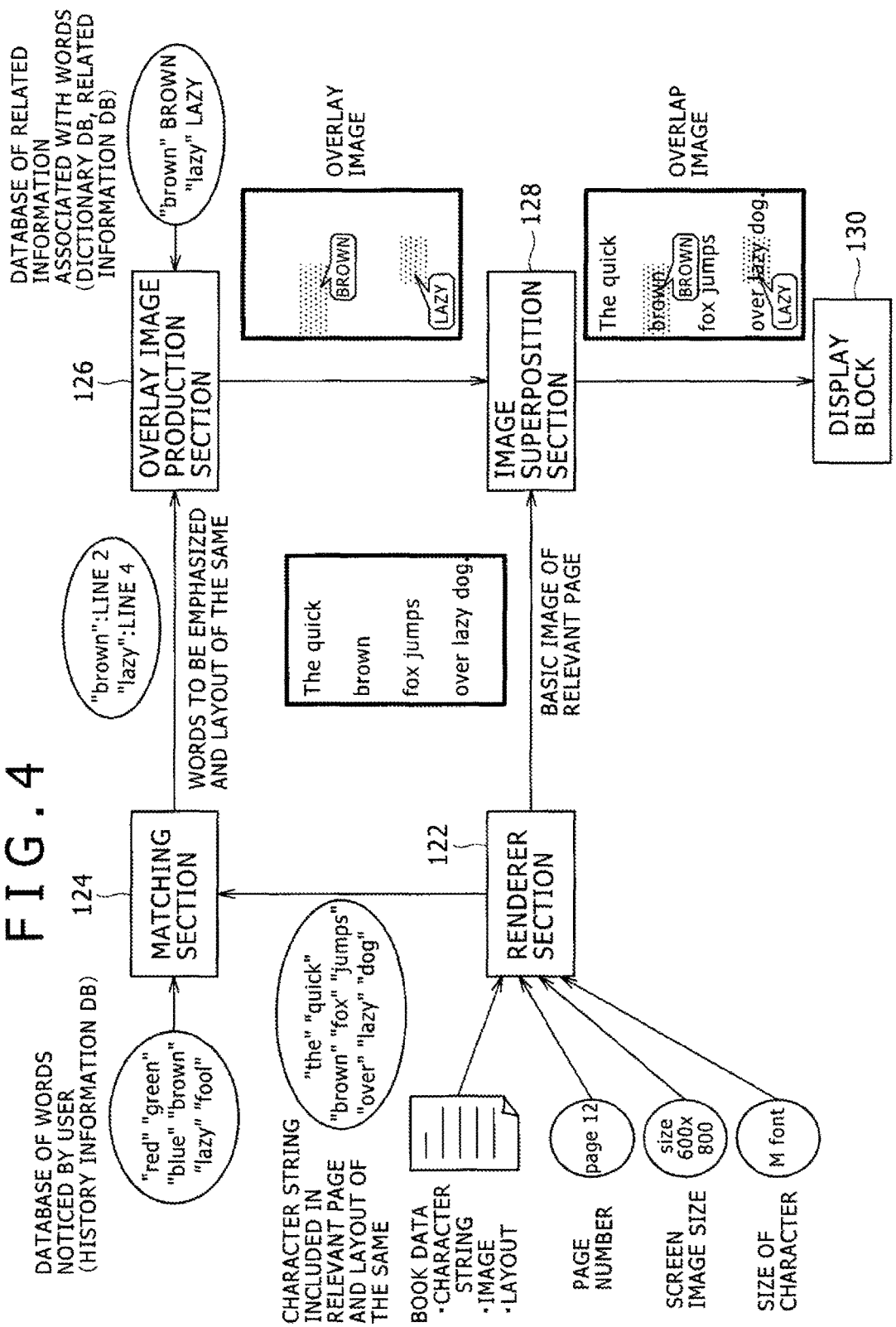
FIG. 4 is a diagrammatic view illustrating an image production process by the electronic book browsing device of FIG. 1.
Figure 5:
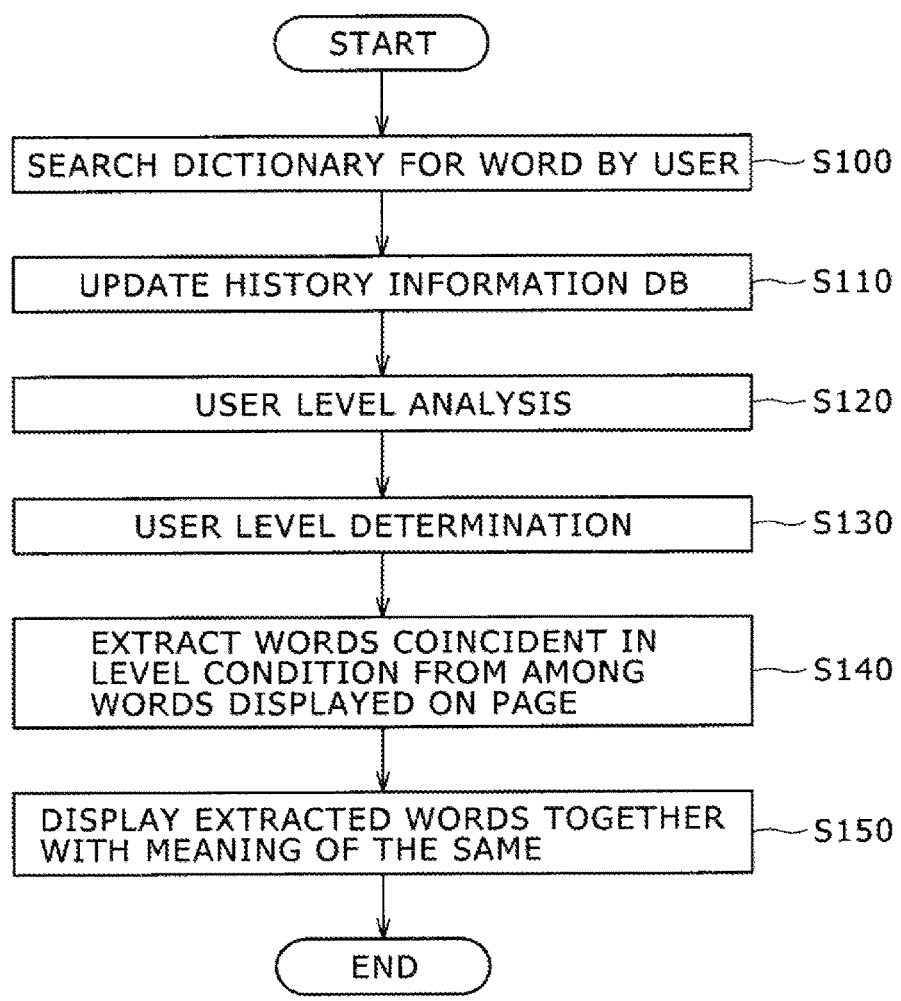
FIG. 5 is a flow chart illustrating an image production process according to a user level by the electronic book browsing device of FIG. 1.
Figure 6:
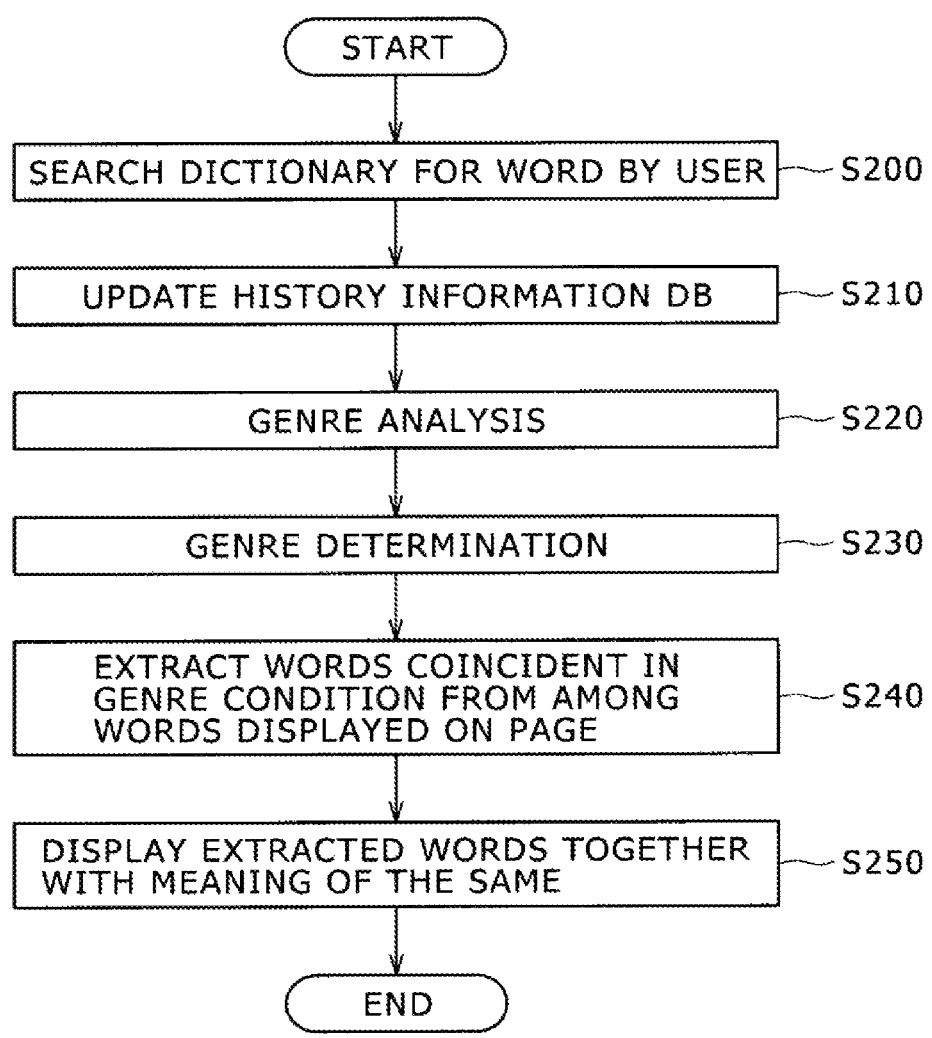
FIG. 6 is a flow chart illustrating an image production process according to a genre of a word by the electronic book browsing device of FIG. 1.
Figure 7:
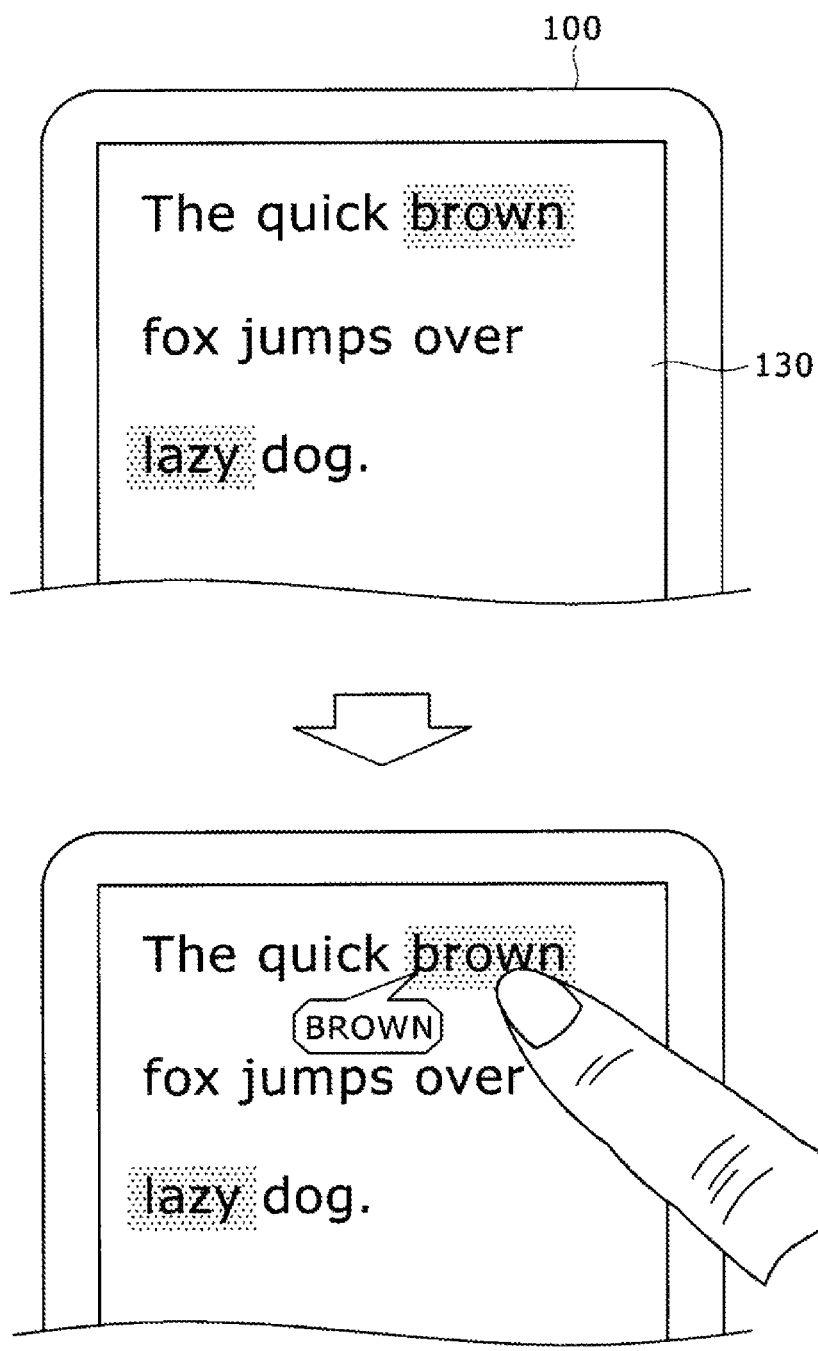
FIG. 7 is a schematic view showing an example of display of an overlap image.
Figure 8:
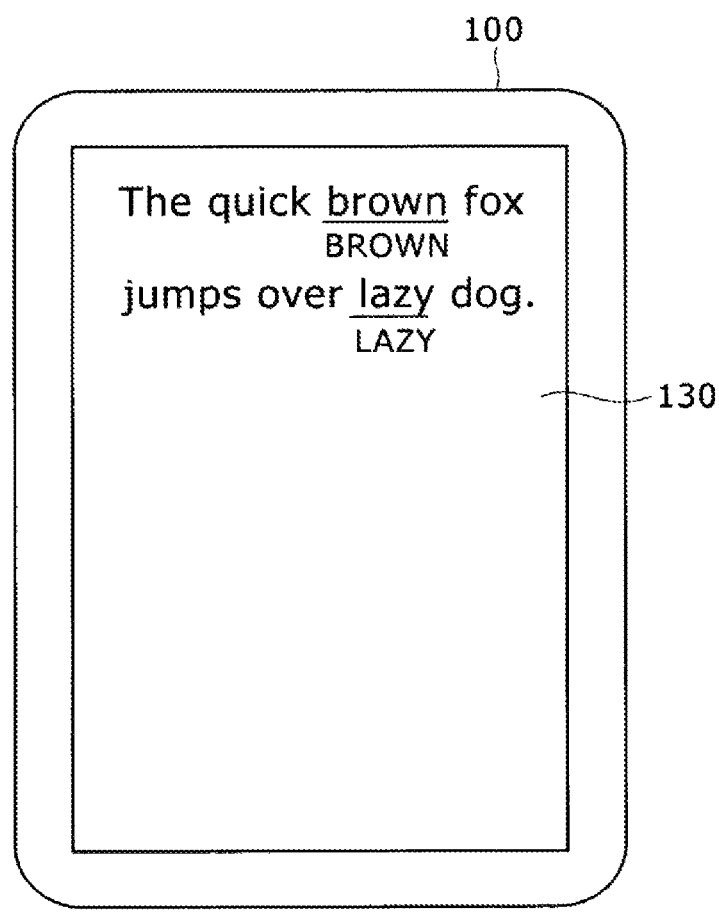
FIG. 8 is a schematic view showing another example of display of an overlap image.
Figure 9:
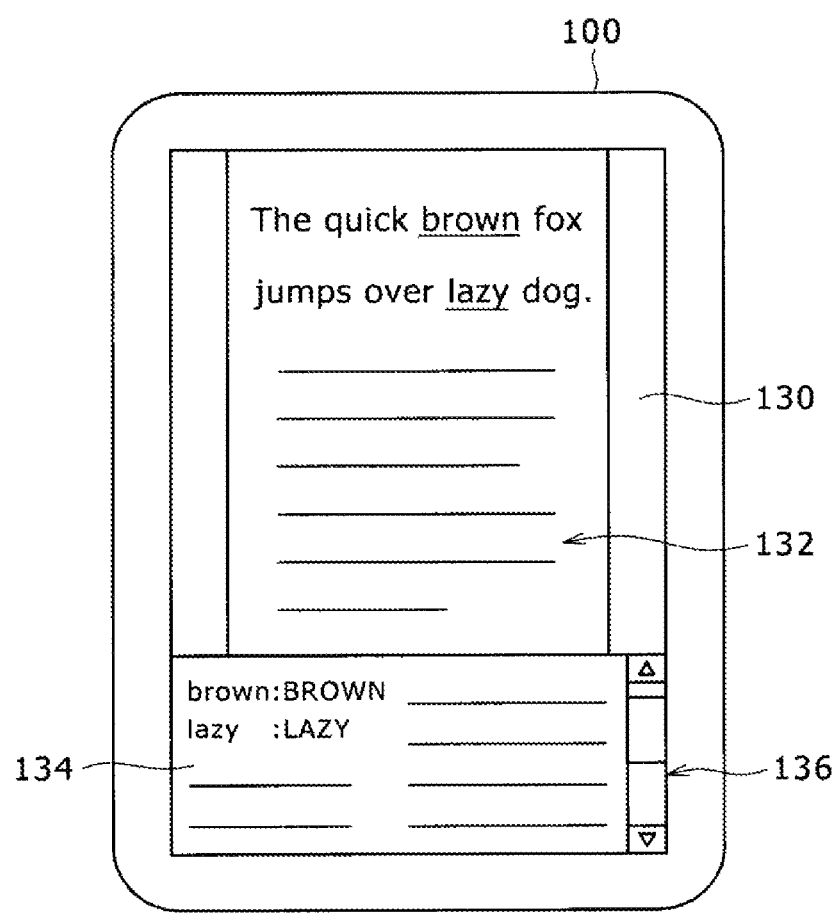
FIG. 9 is a schematic view showing a further example of display of an overlap image.
Figure 11:
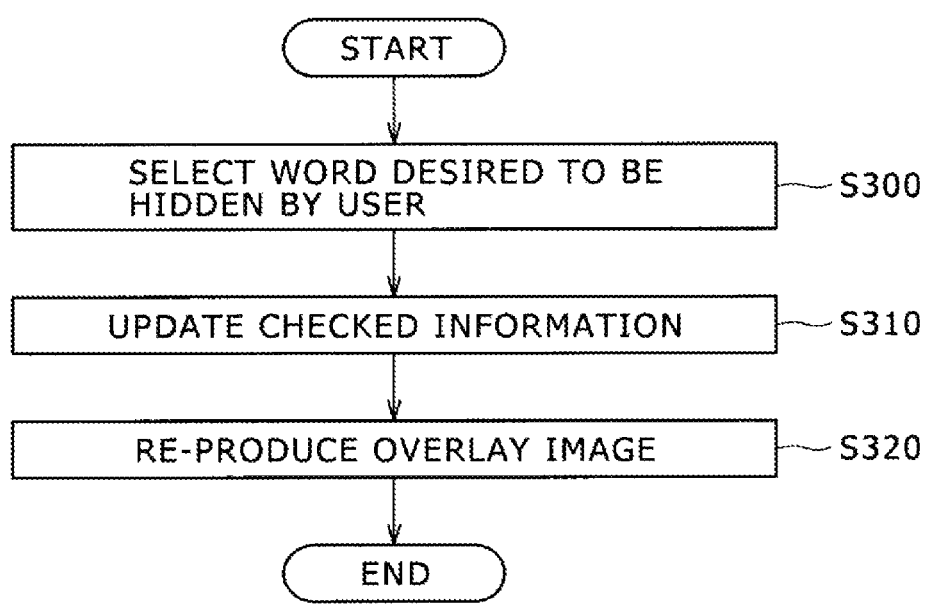
FIG. 11 is a flow chart illustrating an example of a process for deleting related information of some words from an overlay image.

Now, a displaying process of the substance of en electronic book by the electronic book browsing device 100 according to the present embodiment is described with reference to FIGS. 4 to 11. It is to be noted that FIG. 4 illustrates an image production process by the electronic book browsing device 100. FIG. 5 illustrates a flow chart of an image production process carried out in response to the user level by the electronic book browsing device 100. FIG. 6 illustrates a flow chart of an image production process carried out in response to a genre of a word by the electronic book browsing device 100. FIG. 7 shows an example of display of an overlap image. FIGS. 8 and 9 show other examples of display of an overlap image. FIG. 10 illustrates a display changing state when an operation for deleting related information of some words from an overlay image. FIG. 11 illustrates an example of a process of deleting related information to some words from an overlay image.

Displaying Process Flow

First, a displaying process flow of the electronic book browsing device 100 according to the present embodiment is described with reference to FIG. 4. The displaying process flow described below relates to an example wherein the substance of an electronic book to be browsed is displayed together with meaning of a predetermined word determined based on information unique to the user. For example, such a situation is assumed that, when an electronic book described in a language other than Japanese is to be browsed, a Japanese translation of a predetermined word is displayed as related information. Such a displaying process as just described functions in a case in which, for example, a set language of the electronic book browsing device 100 and a describing language of the electronic book to be browsed are different from each other. It is to be noted that, even if the set language of the electronic book browsing device 100 and the describing language of the electronic book to be browsed are same, also it is possible to display information of a dictionary described in the same language like a Japanese language dictionary or a kanji-Japanese dictionary as related information together with the substance of the electronic book.

In the electronic book browsing device 100 according to the present embodiment, for example, if the user selects an electronic book to be browsed from the operation block 110, then the input information from the operation block 110 is outputted to the renderer section 122. The renderer section 122 acquires book data of the electronic book and setting information regarding display of the electronic book from the book database 140 as seen in FIG. 4 to display the selected electronic book on the display block 130. Then, the renderer section 122 produces a basic image for displaying character strings and images included in the book data in accordance with a page number, a screen image size and a character size defined by the setting information along a designated layout. The basic image displays the substance itself of the electronic book. The renderer section 122 outputs the produced basic image to the matching section 124 and the image superposition section 128.

When the basic image is inputted from the renderer section 122, the matching section 124 confirms whether or not the character strings included in the basic image include a word noticed by the user. A character string included in the basic image can be acquired by delimiting the same for each word, for example, as seen in FIG. 4 using an existing method. Meanwhile, a word noticed by the user can be acquired, in the present embodiment, from a search history of the dictionary function. A word searched by the user can be regarded as a word noticed by the user and can be regarded as information unique to the user who owns the electronic book browsing device 100. The matching section 124 refers to the history information database 150, which stores the search history of the dictionary function, to acquire words searched in the past and then confirms whether or not the basic image includes the searched words. Then, the matching section 124 extracts any matching word as a word noticed by the user and outputs the noticed word to the overlay image production section 126 together with the display position of the word in the basic image.

It is assumed that, for example, a sentence "The quick brown fox jumps over lazy dog." is displayed in the basic image. This sentence is composed of eight words. Meanwhile, it is assumed that six words of "red," "green," "blue," "brown," "lazy" and "fool" are stored in the history information database 150 as words searched from the dictionary. At this time, the matching section 124 can confirm that the two words of "brown" and "lazy" are included in the basic image. Then, the matching section 124 outputs the extracted words and the display positions of the words in the basic image to the overlay image production section 126. For example, the information that "brown" in line 2 and "lazy" in line 4 in the basic image are words noticed by the user is outputted to the overlay image production section 126.

Then, the overlay image production section 126 acquires related information associated with the words inputted from the matching section 124 and noticed by the user and produces an overlay image for being displayed on the display block 130 together with the basic image. The related information associated with the words noticed by the user is, for example, in the case of a dictionary which associates words and meanings of the words with each other, meaning of a word, and a color or an image associated with the meaning of the word, information of music and so forth. In the example illustrated in FIG. 4, the overlay image production section 126 acquires meaning of "brown" and "lazy" inputted from the matching section 124 from the dictionary database 160 and produces an overlay image for displaying the acquired meaning of the words in the proximity of the words displayed in the basic image.

The overlay image is produced such that, when it is superposed on the basic image, the display position of each of the words noticed by the user is highlighted and, in the proximity of each of the words, a balloon which displays the meaning of the word is displayed, for example, as seen in FIG. 4. The overlay image production section 126 outputs the produced overlay image to the image superposition section 128.

The image superposition section 128 overlaps the basic image produced by the renderer section 122 and the overlay image produced by the overlay image production section 126 with each other to produce a single overlap image to be displayed on the display block 130. The overlap image exhibits a state in which the meaning of the words noticed by the user is displayed in addition to the substance of the electronic book. Here, each word whose meaning is displayed has been determined based on search results by the dictionary function of the user who owns the electronic book browsing device 100 and is information unique to the user. In this manner, the electronic book browsing device 100 according to the present embodiment can use information unique to the user which can be acquired from a different function provided in the device to automatically implement user experiences specified for the user. The overlap image produced by the image superposition section 128 is displayed on the display block 130 and presented to the user.
Determination of a Word Whose Related Information is to be Displayed Based on the processing flow illustrated in FIG. 4, the electronic book browsing device 100 can present the substance of the electronic book to the user with the related information added to each word noticed by the user. Here, while, in the foregoing description, meaning of a word is displayed for all words searched using the dictionary function by the user, the present disclosure is not limited such example, but various determination methods of words whose meaning is to be displayed are applicable and it is possible to suitably change the applied method.
(1) Word Searched Latest For example, if meaning of all words searched by the dictionary function is displayed, then there is the possibility that a large amount of related information may be displayed, and rather, the electronic book may become less easy to read. Therefore, only meaning of a word or words searched latest which are considered to be words noticed by the user with a high degree of possibility may be displayed. The words searched latest may be approximately 100 words, for example, obtained retrospectively from the present time, and the number of such words may be set in advance or may be set by the user. Further, the words searched latest may be set based on time. For example, those words searched within one month retrospectively from the present time may be determined as words searched latest.

At this time, the history information database 150 may store only words searched latest, and may further store information regarding what numbered word each word is retrospectively from the present time or information representative of the date and time of the search.

(2) Word Searched by a Plural Number of Times

Also it is possible to consider a word searched by a plural number of times as a word which is noticed with a high degree by the user. Therefore, related information may be displayed with regard to any word which has been searched by more than n times, for example, by three times. The search time number can be acquired from the search time number 152 of the history information database 150 illustrated in FIG. 2. Consequently, it is possible to further narrow down words noticed by the user and present related information appropriately.
(3) Word According to a Level of the User Or, the level of the user may be estimated from words searched using the dictionary function by the user and related information is displayed with regard to those words whose level is equal to or higher than the estimated user level. In this instance, there is the possibility that related information may be displayed in regard to a word which has not been searched by the user. By displaying related information such as meaning also regarding a word which has not been searched based on the level of the user, the labor of the user for searching the meaning of a word can be eliminated, and an electronic book which can be read readily by the user can be provided.

In particular, referring to FIG. 5, if the user searches the dictionary for a word at step S100, then the searched word is registered into the history information database 150 to update the history information database 150 at step S110. A user level analysis block not shown of the electronic book browsing device 100 analyzes the user level, for example, at a timing at which the history information database 150 is updated or at a predetermined timing set in advance at step S120.

It is assumed that the user level is stored, for example, in the dictionary database 160. In the example illustrated in FIG. 3, each word registered, for example, in the dictionary database 160 has a level applied thereto in response to the difficulty thereof, and the value of the level increases as the difficulty increases. The user level analysis block analyzes the level of the searched words, for example, by a statistical method and determines the analyzed level of the knowledge of the user as the user level at step S130. The determined user level is stored into a storage block not shown.

Thereafter, the matching section 124 refers to the dictionary database 160 to extract those words whose level is higher than the user level from within the character string displayed on the basic image and determines the words as words noticed by the user at step S140. Then, the overlay image production section 126 produces an overlay image for displaying related information of the words extracted by the matching section 124 such as meaning of the words, and the image superposition section 128 produces an overlap image. Then, the image in which the meaning of the extracted words is displayed is displayed on the display block 130 at step S150.

By estimating the user level from information unique to the user, that is, from words searched using the dictionary function and determining words with regard to which related information is to be displayed in this manner, related information suitable for the level in knowledge of the user can be provided automatically.
(4) Word According to a Genre Further, the tendency of a genre of words may be estimated from words searched using the dictionary function by the user such that related information is displayed with regard to words in a genre in which the user searches words in a high frequency. Also in this instance, there is the possibility that related information may be displayed also with regard to words which have not been searched by the user. By displaying related information such as meaning also with regard to words which have not been searched based on the tendency of the genre of words searched by the user, the labor of the user for searching the meaning of a word can be eliminated, and an electronic book which can be read readily by the user can be provided.

In particular, referring to FIG. 6, if the user searches the dictionary for a word at step S200, then the searched word is registered into the history information database 150 to update the history information database 150 at step S210. A genre analysis block not shown of the electronic book browsing device 100 analyzes the tendency of the genre of searched words, for example, at a timing at which the history information database 150 is updated or at a predetermined timing set in advance at step S220.

It is assumed that also the genre of words is stored in advance, for example, in the dictionary database 160. For example, as illustrated in FIG. 3, a genre 164 to which a registered word belongs is stored in an associated relationship with a word in the dictionary database 160. The number of genres to which a word belongs may be one or a plural number. The genre analysis block analyzes the tendency of the genre of the searched word, for example, by a statistical method and determines the genre of words noticed by the user from the analyzed tendency of the genre at step S230. The number of genres determined here may be one or a plural number. The determined genre is stored into a storage block not shown.

Thereafter, the matching section 124 refers to the dictionary database 160 to extract those words whose genres coincide with the determined genres from within the character string displayed on the basic image and determines the words as words noticed by the user at step S240. Then, the overlay image production section 126 produces an overlay image for displaying related information of the words extracted by the matching section 124 such as meaning of the words, and the image superposition section 128 produces an overlap image. Then, the image in which the meaning of the extracted words is displayed is displayed on the display block 130 at step S250.

By estimating the tendency of genres of words searched by the user from information unique to the user, that is, from words searched using the dictionary function and determining words with regard to which related information is to be displayed in this manner, related information suitable to the user can be provided automatically.

The several variations of the determination method of words whose related information is to be displayed are described above. It is to be noted that the methods described above may individually be applied to the electronic book browsing device 100 or may be applied in combination.
Example of Display of Related Information While the electronic book browsing device 100 displays an overlap image produced by the image superposition section 128 on the display block 130 to present the substance of an electronic book and the related information, the manner of display of the related information may be set for each device or in response to a liking of the user. For example, a word noticed by the user may be highlighted and meaning of the word which is related information may be displayed in the proximity of the word in a balloon as illustrated in FIG. 4. Or it is possible to display related information in a different form. Several examples are illustrated in FIGS. 7 to 11.

(1) Related Information Display in Response to a User Operation

For example, as seen in FIG. 7, in an initial state in which the substance of an electronic book is displayed on the display block 130 of the electronic book browsing device 100, each word extracted as a word noticed by the user is displayed in a highlight while meaning of the word is not displayed. Then, if the user touches at a finger thereof with a word whose meaning is to be displayed from among such highlighted words, then meaning of the word displayed at the touched position is displayed around the word in a balloon.

In the example of FIG. 7, it is assumed that the user touches at a finger thereof with the highlighted word "brown." Then, a balloon with meaning "BROWN" of the word therein is displayed in the proximity of the word "brown" such that, for example, it extends from an arbitrary edge portion of the highlighted portion and a meaning display portion is displayed between a line in which the word is displayed and an adjacent line. By allowing the user to intentionally display meaning of a word which is related information in this manner, the user can observe the substance of the electronic book readily. It is to be noted that, while, in the example of FIG. 7, words with regard to which related information can be displayed is represented by highlighting, the present disclosure is not limited to this. In particular, for example, it is possible to add an underline in place of highlighting, display a small button around the word or change the color of characters to represent a word whose related information can be displayed.

(2) Related Information Display Together with an Underline

An underline may be applied to a word extracted as a word noticed by the user and meaning of the word which normally is related information may be displayed below the word as seen in FIG. 8.

(3) Related Information Display by a Footnote

Or, a book displaying region 132 for displaying the substance of an electronic book may be disposed in a reduced scale in the display region of the display block 130, and related information of words extracted as words noticed by the user may be displayed collectively in a portion of the display region of the display block 130 other than the book displaying region 132. For example, as seen in FIG. 9, a related information displaying region 134 for displaying related information may be disposed on the lower side of the book displaying region 132 such that meaning of words which is related information is displayed like footnotes. In the case where all related information cannot be displayed in the related information displaying region 134, a scroll bar 136 may be provided such that also the related information can be confirmed on a screen image same as that of the substance of the electronic book displayed in the book displaying region 132.

The related information displaying region 134 may normally be displayed on the display block 130 or may not usually be displayed but be displayed only when a predetermined operation is carried out, for example, only when a related information displaying button, which may be provided additionally, is depressed. Further, while, in the example shown in FIG. 9, the related information displaying region 134 is disposed on the lower side of the book displaying region 132, the present disclosure is not limited to the example described. In particular, the related information displaying region 134 may otherwise be disposed, for example, on the upper side of the book displaying region 132 or on the left or right side of the book displaying region 132.

(4) Hiding of Related Information by a Check of the User

In the electronic book browsing device 100 according to the present embodiment, related information can be automatically displayed on the display block 130 together with the substance of an electronic book by such a displaying method as described hereinabove. However, also it is possible to thereafter hide related information of a predetermined word by an operation of the user. For example, if meaning of a word remembered by the user is always displayed, then this already is unnecessary information to the user and rather makes the substance of the electronic book hard to see. Therefore, it is made possible to allow the user to hide related information displayed automatically.

For example, it is assumed that, in an initial state in which the substance of an electronic book is displayed on the display block 130, a word extracted by the matching section 124 is displayed together with an underline and meaning of the word as shown in FIG. 10. At this time, if the user wants to hide meaning of some of the displayed words, then the user would carry out an operation for selecting the word at step S300 of FIG. 11. Where a touch sensor is used as the operation block 110, the selection operation of the words may be an operation of tracing the meaning of the word with a finger, for example, as seen in FIG. 11. By applying such an operation as to erase meaning of a word with a finger in this manner, the user can carry out an operation for hiding the meaning of the word intuitively.

If a word to be hidden is selected, then the renderer section 122 updates the checked information 153 of the history information database 150 based on a result of the detection by the touch sensor at step S310. The checked information 153 is a hide flag indicative of whether or not related information is to be hidden intentionally by the user. For example, it can be defined that, if "1" is placed in the checked information 153, then the related information is to be hidden, but if any other value than "1" is placed in the checked information 153, then the related information is to be displayed. The matching section 124 excludes, from among the words extracted by the matching process, any word whose checked information 153 is "1" from those words whose related information should be displayed and outputs the remaining words to the overlay image production section 126.

The overlay image production section 126 re-produces an overlay image based on the words inputted from the matching section 124 and outputs the re-produced overlay image to the image superposition section 128 at step S320. Then, the image superposition section 128 superposes the basic image and the overlay image to produce a new overlap image, and the overlap image is displayed on the display block 130. In this instance, meaning of any word with regard to which related information is determined to be hidden is not displayed as seen in FIG. 10. Any word with regard to which related information is determined to be hidden by the user is not displayed any more. By hiding related information, which it is considered unnecessary to display by the user, in this manner, it is possible to make it easy to see the substance of the electronic book.

Examples of Information Utilizable as Related Information

While, in the foregoing description of the embodiment, meaning associated with a word searched using the dictionary function is used as related information, such various kinds of information as illustrated, for example, in FIG. 12 can be utilized as related information.

For example, if the substance of an electronic book includes a place name of an address of a friend registered in an address book of an address book function, then the name of the friend may be displayed as related information in the proximity of the place name. Further, the electronic book browsing device 100 may be configured such that it analyzes a sentence when writing into a blog is carried out so that it can extract significant words such as a word which characterizes the substance of the sentence. At this time, also it is possible to dispose a button which allows, if a significant word is included in the substance of the electronic book, jumping to a URL of the blog as related information on the display block 130.

Further, the electronic book browsing device 100 may extract an author name of an electronic book stored therein and display, if the author name is included in the substance of the electronic book, an electronic book name of the author stored therein as related information. Further, the electronic book browsing device 100 may acquire a name of a photographing place of a photograph stored therein from the photograph and display, if the name of the photographing place is included in the substance of the electronic book, the photograph stored in the electronic book browsing device 100 as related information. Similarly, the electronic book browsing device 100 may acquire a title of a piece of music stored therein and a composer name of the music from the music and reproduce, if the title of the piece of music or the composer name is included in the substance of the electronic book, the music stored in the electronic book browsing device 100 as related information. Or, also it is possible to dispose a reproduction button for reproducing the music stored in the electronic book browsing device 100 as related information on the display block 130 in place of reproduction of the music.

Also it is possible for the electronic book browsing device 100 to place a marker into the substance of an electronic book displayed. At this time, also it is possible to dispose a jumping button for jumping to a different page which includes a word same as a word to which a marker is applied by the user as a noticed word on the display block 130.

While several kinds of information which can be utilized as related information are described above, the present disclosure is not limited to such examples. Information unique to the user which can be acquired from a function of the electronic book browsing device 100 different from the browsing function for an electronic book can be determined as a noticed word, and various kinds of information associated with the word can be displayed as related information. By storing such words and related information associated with the words, for example, in the related information database 170, various kinds of information can be automatically added and provided to the user.

The user can operate the electronic book browsing device 100 not only to carry out browsing of a book but also to add additional factors to the substance of an electronic book such as to put a tag such as a bookmark or draw a picture. The electronic book browsing device 100 is usually utilized as a possession of each user, and also the stored substance is unique to the user. For example, it can be considered that a liking of the user is reflected on a genre of books stored in the electronic book browsing device 100. Further, in the electronic book browsing device 100 with a dictionary function or a web browsing function, a search history of each function is considered information unique to the user.

The electronic book browsing device 100 according to the present embodiment can implement not only mere browsing of the substance of a book but also user experience specified for the user utilizing such user-unique information upon browsing of an electronic book.

<4. Example of the Hardware Configuration>

Although processing by the electronic book browsing device 100 according to the present embodiment can be executed by hardware, it may otherwise be executed by software. In this instance, it is possible to configure the electronic book browsing device 100 in such a manner as seen in FIG. 13. In the following, an example of the hardware configuration of the electronic book browsing device 100 according to the present embodiment is described with reference to FIG. 13.

The electronic book browsing device 100 according to the present embodiment can be implemented by a processing device such as a computer as described hereinabove. Referring to FIG. 13, the electronic book browsing device 100 includes a central processing unit (CPU) 101, a read only memory (ROM) 102, a random access memory (RAM) 103, and a host bus 104a. The electronic book browsing device 100 further includes a bridge 104, an external bus 104b, an interface 105, an inputting apparatus 106, an outputting apparatus 107, a storage apparatus 108 which may be a hard disk drive (HDD), a drive 109, a connection port 111, and a communication apparatus 113.

The CPU 101 functions as an arithmetic processing unit and a control apparatus and controls operation of the electronic book browsing device 100 in accordance with various programs. The CPU 101 may be a microprocessor. The ROM 102 stores programs, calculation parameters and so forth to be used by the CPU 101. The RAM 103 temporarily stores programs to be used in execution of the CPU 101 and parameters and so forth which suitably vary in the execution. The CPU 101, ROM 102 and RAM 103 are connected to each other by the host bus 104a configured from a CPU bus or the like.

The host bus 104a is connected to the external bus 104b such as a PCI (Peripheral Component Interconnect/Interface) bus through the bridge 104. It is to be noted that there is no necessity to configure the host bus 104a, bridge 104 and external bus 104b separately from each other but the functions of them may be incorporated in one bus.

The inputting apparatus 106 includes inputting devices such as a mouse, a keyboard, a touch panel, buttons, a microphone, switches, levers and so forth, and an inputting control circuit for producing an input signal based on an input by the user and outputting the input signal to the CPU 101. The outputting apparatus 107 includes a display apparatus such as, for example, a liquid crystal display (LCD) unit, an OLED (Organic Light Emitting Diode) apparatus and a lamp, and a sound outputting apparatus such as a speaker.

The storage apparatus 108 is an example of a storage block of the electronic book browsing device 100 and is used to store data. The storage apparatus 108 may include a storage medium, a recording apparatus for recording data on the storage medium, a readout apparatus for reading out data from the storage medium, a deletion apparatus for deleting data recorded on the storage medium, and so forth. The storage apparatus 108 is configured, for example, a hard disk drive (HDD). The storage apparatus 108 drives a hard disk to store programs to be executed by the CPU 101 and various data.

The drive 109 is a reader/writer for a storage medium and is built in or externally connected to the electronic book browsing device 100. The drive 109 reads out information recorded on a removable recording medium such as a magnetic disk, an optical disk, a magneto-optical disk or a semiconductor memory loaded therein and outputs the information to the RAM 103.

The connection port 111 is an interface to be connected to an external apparatus and is a connection port to an external apparatus to which data can be transmitted, for example, by a USB (Universal Serial Bus). Meanwhile, the communication apparatus 113 is a communication interface configured, for example, from a communication device for connection to the communication network 10. The communication apparatus 113 may be a communication apparatus ready for a wireless LAN (Local Area Network), a communication apparatus ready for a wireless USB or a wire communication apparatus which carries out communication by wire.

While a preferred embodiment of the present disclosure has been described above with reference to the accompanying drawings, naturally the present disclosure is not limited to the embodiment. It is apparent that a person skilled in the art could have made various alterations or modifications without departing from the spirit and scope of the disclosure as defined in claims, and it is understood that also such alterations and modifications naturally fall within the technical scope of the present disclosure.

For example, while, in the embodiment described hereinabove, a word noticed by the user from among words included in the substance of an electronic book is illustrated with related information added thereto by the electronic book browsing function of the electronic book browsing device 100, the present disclosure is not limited to this example. For example, a function of the electronic book browsing device 100 other than the browsing function may automatically add related information to the displayed subject based on user-unique information. The electronic book browsing device 100 may use the web browsing function such that may detect a word, an image or the like noticed by the user from the substance displayed on the display block 130 and produce an overlay image for displaying related information associated with the word, image or the like on the display block 130.

The present disclosure contains subject matter related to that disclosed in Japanese Priority Patent Application JP 2010-158775 filed in the Japan Patent Office on Jul. 13, 2010, the entire content of which is hereby incorporated by reference.

What is claimed is:

1. An information processing apparatus, comprising:
a memory configured to store instructions and a first information associated with a user;
an interface configured to receive an input from the user, wherein the received input identifies a content; and
a processor configured to execute the instructions stored in the memory, wherein the processor is configured to:
obtain data related to the content identified by the received input;
generate history information based on the stored first information, wherein the history information identifies at least one first word unique to the user;
determine a frequently searched genre based on the generated history information;
identify at least one second word, from a plurality of third words included in the obtained data related to the content, based on:
a first comparison between the generated history information and the obtained data related to the content, and
a second comparison between a genre of at least one fourth word among the plurality of third words and the frequently searched genre;

retrieve a second information associated with the at least one second word based on a word level of the at least one second word, wherein the word level is an integer value; and generate an image based on the obtained data related to the content and the retrieved second information.

2. The information processing apparatus of claim 1, further comprising a display screen configured to display the content and the generated image.

3. The information processing apparatus of claim 2, wherein the processor is further configured to control the display screen to superimpose the generated image on the displayed content.

4. The information processing apparatus of claim 2, wherein the processor is further configured to control the display screen to display the retrieved second information associated with the at least one second word in a dedicated window on the display screen.

5. The information processing apparatus of claim 2,
wherein the interface is further configured to receive a control input from the user, and
wherein the processor is further configured to control the display screen to display the retrieved second information together with the at least one second word based on the received control input.

6. The information processing apparatus of claim 1, wherein the history information comprises:
at least one fifth word searched based on a dictionary function; and
a number of times the at least one fifth word is searched based on the dictionary function.

7. The information processing apparatus of claim 1, wherein the history information comprises third information that indicates whether the second information associated with the at least one second word is to be retrieved.

8. The information processing apparatus of claim 1, wherein the word level is determined based on a number of times the at least one second word is searched based on a dictionary function.

9. The information processing apparatus of claim 1, wherein the history information comprises dictionary information indicative of a first genre of the at least one first word.

10. The information processing apparatus of claim 1, wherein the processor is further configured to retrieve the second information associated with the at least one second word based on the at least one second word that has been searched within a period of time.

11. The information processing apparatus of claim 1, wherein the processor is further configured to retrieve the second information associated with the at least one second word based on the at least one second word that has been searched more than a number of times.

12. The information processing apparatus of claim 1, wherein the processor is further configured to retrieve the second information associated with the at least one second word based on the word level of the at least one second word that is greater than a threshold.

13. The information processing apparatus of claim 1, wherein the processor is further configured to highlight the at least one second word in the displayed content of the generated image based on the word level of the at least one second word.

14. The information processing apparatus of claim 1, wherein the history information comprises at least one of a search result of a dictionary function, a search result of a web browser function, a substance of registrations of an address book function, or a genre of book data that correspond to the user.

15. The information processing apparatus of claim 1, wherein the processor is further configured to retrieve the second information associated with the at least one second word based on a user level that corresponds to the user,
wherein the user level is an integer value, and
wherein the user level is determined based on the history information.

16. The information processing apparatus of claim 1, wherein the processor is further configured to retrieve the second information based on a user level that corresponds to the user, wherein the user level is an integer value.

17. The information processing apparatus of claim 1, wherein based on reception of a control input indicative of a command to remove display of the second information at the interface, the processor is further configured to display only the at least one second word.

18. An information processing method, comprising:
in an information processing apparatus:
receiving an input from a user, wherein the received input identifies a content;
obtaining data related to the content identified by the received input;
generating history information based on user information associated with the user,
wherein the user information is stored in the information processing apparatus, and
wherein the history information identifies at least one first word unique to the user;
determining a frequently searched genre based on the generated history information;
identifying at least one second word, from a plurality of third words included in the obtained data related to the content, based on:
a first comparison between the generated history information and the obtained data related to the content, and
a second comparison between a genre of at least one fourth word among the plurality of third words and the frequently searched genre;
retrieving related information associated with the at least one second word based on a word level of the at least one second word, wherein the word level is an integer value; and
generating an image based on the obtained data related to the content and the retrieved related information.

19. A non-transitory computer-readable medium having stored thereon, computer-executable instructions for causing an information processing device to execute operations, the operations comprising:
receiving an input from a user, wherein the received input identifies a content;
obtaining data related to the content identified by the received input;
generating history information based on user information associated with the user,
wherein the user information is stored in the information processing device, and
wherein the history information identifies at least one first word unique to the user;
determining a frequently searched genre based on the generated history information;
identifying at least one second word, from a plurality of third words included in the obtained data related to the content, based on:

a first comparison between the generated history information and the obtained data related to the content, and a second comparison between a genre of at least one fourth word among the plurality of third words and the frequently searched genre;

retrieving related information associated with the at least one second word based on a word level of the at least one second word, wherein the word level is an integer value; and generating an image based on the obtained data related to the content and the retrieved information.

\* \* \* \* \*